United States Patent [19]

Chenal

[11] Patent Number: 4,897,142

[45] Date of Patent: Jan. 30, 1990

[54] PROCESS AND APPARATUS FOR THE CONTINUOUS LINE MANUFACTURE OF PENCILS

[75] Inventor: Jean-Bernard Chenal, Saint-Cergues, France

[73] Assignee: Caran d'Ache S.A., Thonex, Switzerland

[21] Appl. No.: 233,077

[22] Filed: Aug. 17, 1988

[30] Foreign Application Priority Data

Sep. 4, 1987 [CH] Switzerland ........................ 3415/87

[51] Int. Cl.[4] ............................................. B32B 31/18

[52] U.S. Cl. .................................... 156/257; 156/267; 156/268; 156/277; 156/292; 156/510; 101/93.01; 144/28

[58] Field of Search ............... 156/250, 267, 268, 277, 156/304.2, 510, 292, 257; 101/93.01; 346/135.1, 139 R, 140 R; 144/28

[56] References Cited

U.S. PATENT DOCUMENTS

| | | | |
|---|---|---|---|
| 1,783,997 | 12/1930 | Burden et al. | 144/28 |
| 2,492,250 | 12/1949 | Wilcox | 144/28 |
| 2,952,204 | 9/1960 | Sherman | 101/93.01 |
| 3,039,384 | 6/1962 | Kingsley | 101/11 |
| 3,456,581 | 7/1969 | Zuber | 144/28 |
| 4,228,438 | 10/1980 | Vazirani | 346/1.1 |
| 4,392,204 | 7/1983 | Prim et al. | 101/93.01 |

FOREIGN PATENT DOCUMENTS

| | | |
|---|---|---|
| 681364 | 9/1939 | Fed. Rep. of Germany . |
| 1953985 | 12/1971 | Fed. Rep. of Germany . |
| 3330119 | 3/1985 | Fed. Rep. of Germany . |
| 959830 | 4/1950 | France . |

*Primary Examiner*—Caleb Weston

*Attorney, Agent, or Firm*—Young & Thompson

[57] ABSTRACT

A process for the continuous manufacture of pencils comprises the steps of laying pencils leads between two half small boards which are longitudinally grooved and fixed together by gluing and pressing to form small board sandwiches, of trimming the transverse ends of these small boards, and then of cutting them between the lead located within the logitudinal grooves. After having clipped the ends of the small boards to trim them, a protecting layer is applied onto the thus formed edges, on which layer an identification mark is thereafter printed, the deposition of the protecting layer and the printing of the identification mark being carried out by means of a projecting device under pressure of protecting liquid drops and printing liquid drops, respectively, which device comprises projecting heads.

9 Claims, 2 Drawing Sheets

PROCESS AND APPARATUS FOR THE CONTINUOUS LINE MANUFACTURE OF PENCILS

The present invention relates to the field of line production of pencils, and more particularly an improvement brought to this manufacture process and to the plant for working thereof.

As will be described hereafter, by reference to the annexed drawing, the continuous line manufacturing process of pencils, as it is now worked in a manner known per se, comprises the following main steps:

laying of the leads in appropriate pre-glued grooves which are longitudinally provided within a first half wood small board;

after applying glue, laying of a second half small board of identical shape and provided with grooves, the grooved face being also pre-glued, then putting under pressure of the small boards or "sandwiches" containing the leads;

clipping for trimming the ends of these boards, and longitudinal cutting between the leads to form the pencils.

Thus, in this process, once the second half small board has been laid, the leads are visible from outside only at their ends, on the transverse edges of said board. About twenty different shades now exist for pencils with black leads, and about a hundred types of leads with different colours. It is therefore essential to be able to mark the boards prior to the final cutting, in such a manner to distinguish these different shades or colours. On the other hand, it is also necessary, after the trimming step, to apply glue on the trimmed edges of the boards, so as to avoid in the final step and in the subsequent handlings the occurrence of graphite dust, coming from the ends of the leads, which contaminates or damages the processing plant.

Now the precited problem is resolved, but in a non satisfactory and non rational manner, by interrupting the line of manufacture for putting the boards on appropriate supports so as to apply a thin layer of a coloured varnish onto the transversal ends of the boards, for example by means of a device of the plant spraying pistol type.

In addition to the important drawback of breaking the continuous process, this technique further presents the disadvantage of not being able to be automatically worked and to lead to an insufficient result with regards to the marking, since it is practically impossible to differentiate in a sure manner the marked small boards only by a determined colour, as the number thereof may amount to about 80 to 120.

The purpose of this invention consists in providing a process which allows to remedy the precited drawbacks, and which could be worked in an entirely automatic manner and with a marking easy to realize and to decode afterwards.

The continuous process of manufacture of pencils, object of this invention, leading to reach the precited purpose, and which comprises the known steps mentioned above, is characterized by the fact that after clipping said ends to trim them, a protecting layer is applied onto the edges thus formed, on which an identification mark is printed, the deposition of the protecting layer and the printing of the mark being carried out by jet under pressure of drops of a protecting liquid respectively a printing liquid.

Furthermore, a second object of the invention consists in a plant for working the above process, which comprises, disposed the ones following the others, a grooving machine, a device for laying the leads and a preghing device, a press-drum, a trimming device and a cutting device, a coating device, and a marking device being placed between both last elements of the plant.

The annexed drawing, which the following description is referring to, illustrates the invention schematically and by way of example.

Figure 1:
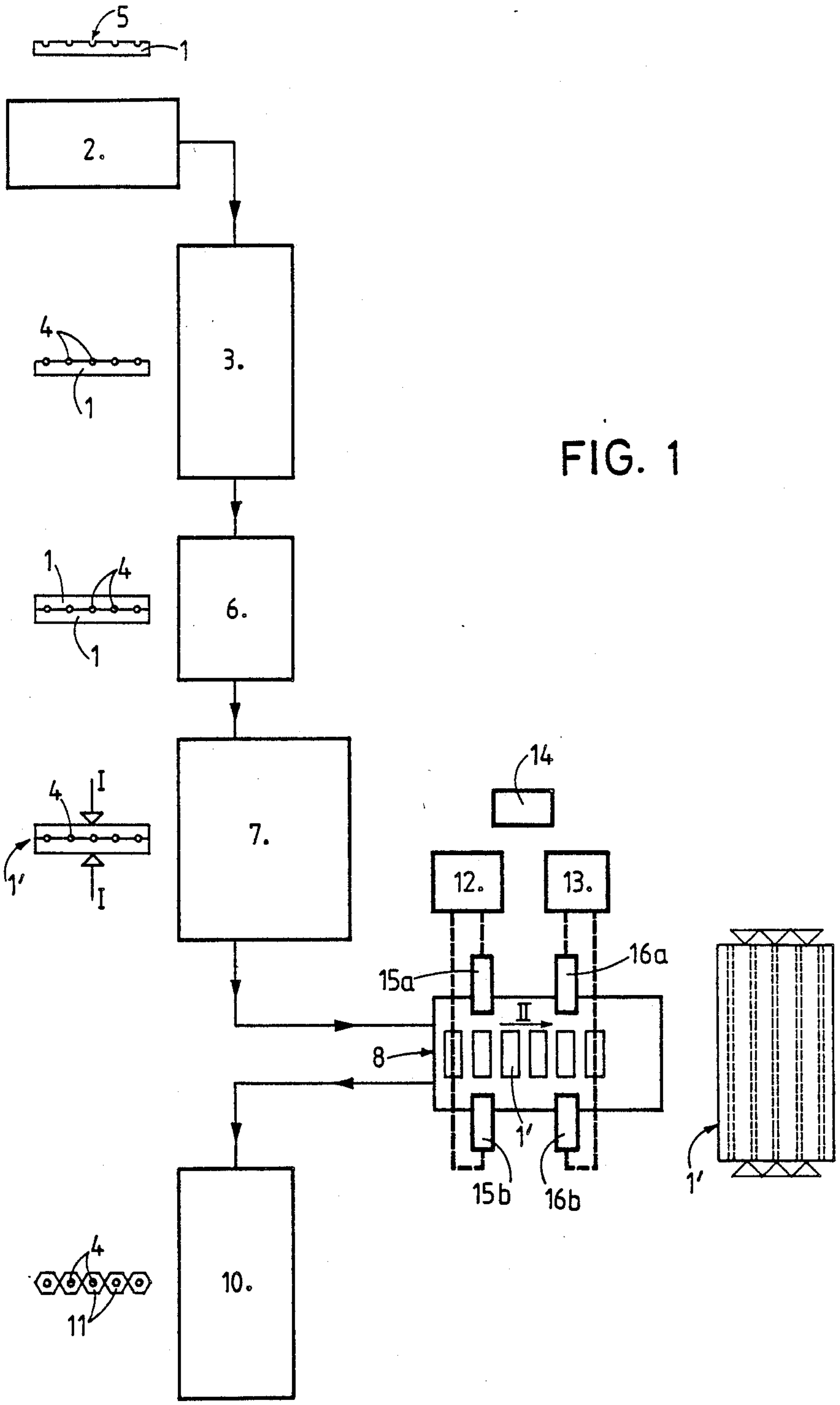
FIG. 1 is a scheme illustrating a known line of manufacture in which the improvement according to the invention is included.

By reference first to FIG. 1, the scheme presented shows the various steps of the manufacture process together with facing to each of these steps the advancement of the manufacture.

The half small boards 1 are first submitted to an operation of longitudinal grooving by means of a grooving machine 2. Then, in a device 3, after disposition of a streak of glue into each groove 5, the leads 4 are laid into threse grooves. A second half small board 1, the grooved face of which is provided with a layer of glue, is then placed on the first one in a manner to form under 6 a small board or sandwich 1' containing the leads 4. This small board 1' is submitted to the action of a drum-press 7 in a way to firmly fix together both half small boards 1 (pressure according to arrows I).

The small boards 1' are then clipped at their transverse ends, in such a manner to trim them and to provide thus small boards with clear edges, this by means of a trimmer (not shown).

At this stage of the process of manufacture, the coating and marking device 8 is disposed, which more particularly constitutes the object of the invention. As a matter of fact, after the trimming step, the small boards 1', which are continuously advancing, are provided on their edges on one part with a layer of protecting paint or varnish, and on the other part with an identification mark which may comprise ciphers and/or coding letters.

Finally, the small boards 1' thus protected and marked are brought into a cutting device 10, in which they are longitudinally cut between the leads 4 to form the pencils 11, for example of hexagonal section.

One of the main aspects of this invention resides in the particular application of a newly known technology for marking by liquid jet, for example of ink, allowing the printing at high speed and with a high precision. This technique implies the combined action of a vibratory device of the piezoelectric type and of a system for pressurizing an appropriate liquid, forcing it through a nozzle of low diameter, and which leads to the obtention of a train of standardized drops (frequency of production, drops diameter, position of jet break). At the jet break, the drops are individually charged at variable levels by passing between electrodes at an appropriate electric potential. The drops then pass between plates at a high potential, wherey they are subjected to a deviation which is proportional to their charge and in conformity with the desired impact position.

A device of the precited type (for example "Willet Printos" from the company Willet Sarl in Paris, or "Jaime 2000" from the company Image in Valence, France), is thus incorporated in the plant of pencils manufacture, after adaptation in a view of this particular new application.

Figure 2:
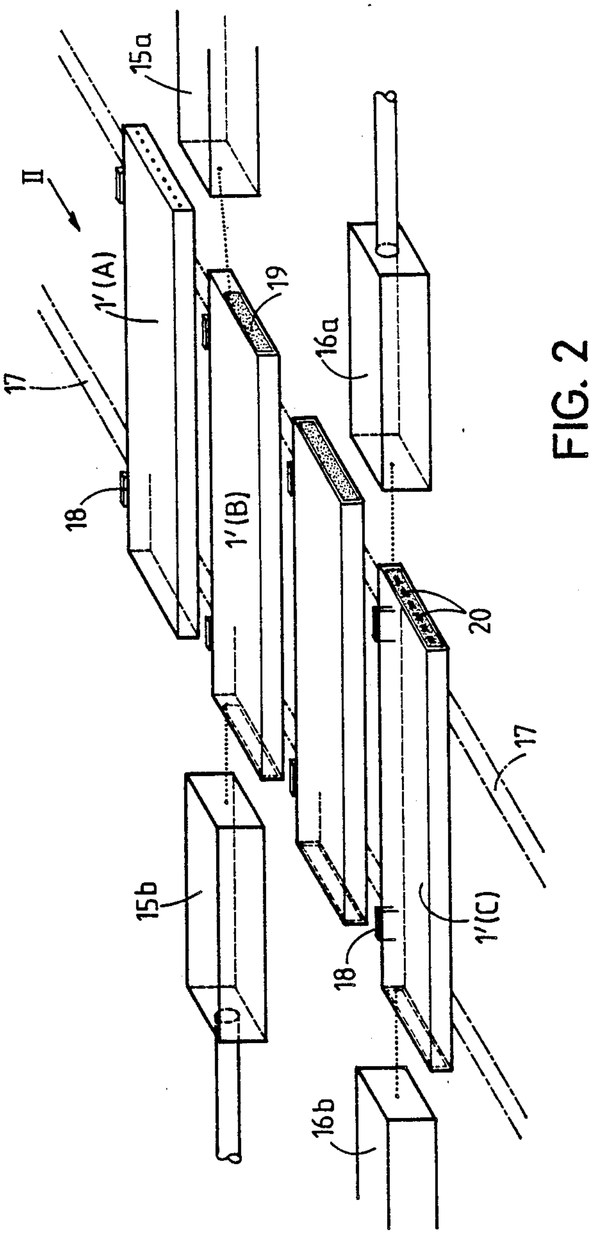
FIG. 2 is a schematic view in perspective showing the disposition of the marking devices with regards to the passage of the small boards.

As shown on the scheme of FIG. 1, and in more details on that of FIG. 2, the coating and marking device 8 comprises two generators 12,13 of liquid jets under pressure, which are disposed the one after the other in the direction of advance of the small boards 1'. Both generators 12,13 are controlled by a common programmable control unit 14 and are each connected to two printing heads 15*a*, 15*b*; 16*a*, 16*b*, which are disposed by pair and on both sides of the passage way of the small boards 1'.

As illustrated in FIG. 2, the small boards 1' are passing in the direction of the arrow II between the printing heads 15*a*, 15*b*; 16*a*, 16*b*, which are disposed transversely with regards to this passage way on a driving device, generally of the endless type and which may be constituted by two parallel chains or bands 17, by a single wide band, etc. The small boards 1' are placed on this driving device by means of stop members 18. The sandwich small board 1' (A) after having been trimmed at its ends is first passing between the heads 15*a*, 15*b* which are adapted to spray or squirt onto the edges of said small board 1' (B) a protection ground layer 19, for example a varnish. Then, the small board 1' (C) is provided on its edges thus coated with a mark or a code 20 (letters, ciphers or combination of both) by passing between the heads 16*a*, 16*b*, which are adapted for printing with precision such signs, corresponding to the hardness of the leads or to the colour thereof. These heads 16*a*, 16*b* are thus projecting preferably a printing ink.

Of course, the whole of the protecting and marking device 9 is working automatically, the control unit 14 which is common to both generators 12,13 being programmable especially according to the advance speed of the small boards 1', to the sizes of the edges thereof to be treated, to the nature and the characteristics (viscosity, etc.) of the respective liquids to be projected, etc. On the other hand, measuring and/or detection elements (not shown) are foreseen to automatically provide to the control unit the information necessary for its working, such as the instant position of each small board, the sizes thereof, etc. All these means may be incorporated from manufacture into the printing heads.

Thus, thanks to this original application of a new technique, the pencil manufacture process may be rationalized. The use of jets under pressure of an appropriate liquid allows obtaining a thin protecting coating which is very quickly dry and the printing without interruption of the advance of the small boards of marking or coding indications thereon.

On the other hand, the same technique of liquid jet under pressure as small drops may be also used, in the process of continuous manufacture of pencils, for the preliminary pre-gluing either of the grooves, or of the whole of the grooved surface of both half small boards forming the "sandwich". In this case, it is convenient to include in the plant for the working of the process, a jet device under pressure of a liquid, for example of the type that described by reference to the annexed drawing, more particularly at the level of the grooving machine and before the drum-press. It will also be possible to have a generator with ejection head of liquid glue under the form of small drops of determined diameter, prior to the deposition in each groove of the half small boards, before the laying of the leads, of a spreak of glue; optionally, a second generator with ejection head will be disposed in a manner to coat with glue the grooved surface of the other small boards prior to the formation of the sandwiches by pressing. This supplementary variant allows to still more rationalize the manufacture process and especially to secure a better quality to the pencils thus produced, especially thanks to the possibility of assuring the deposition of glue in each groove intended to receive a lead, this not being the case with the techniques now in use.

I claim:

1. A process for the continuous manufacture of pencils, comprising the steps of laying pencil leads between two half boards having longitudinal grooves, fixing the half boards together by pressing to form sandwich boards, trimming the transverse edges of these sandwich boards, applying a protective layer to the trimmed transverse edges thus formed and thereafter printing an identification mark on the protective layer, wherein the application of the protective layer and the printing of the idenification mark are carried out by jet under pressure of drops of a protective liquid and a printing liquid, respectively.

2. A process according to claim 1, wherein the application of the protective layer and the printing of the identification mark comprise advancing the sandwich boards in a direction perpendicular to the extent of the pencil leads, between first and second pairs of projection heads disposed one after the other in the said direction of advance, said first pair of projection heads being adapted for the projection of drops of the protective liquid, and said second pair for the projection of drops of a printing liquid, each of said first and second pairs of projection heads being connected to a respective piezoelectric generator for pressurizing the protective liquid and the printing liquid, respectively, said respective piezoelectric generators being conjointly controlled by a programmable control unit.

3. A process according to claim 1, further comprising the step of applying a streak of glue into the longitudinal grooves of said half boards by jet under pressure of liquid glue drops, prior to said step of laying pencil leads between two said half boards.

4. A process according to claim 1, further comprising the step of applying a layer of glue onto the half boards by jet under pressure of liquid glue drops, prior to said step of fixing the half boards together.

5. Apparatus for practicing the process according to claim 1, comprising a grooving machine, means for laying pencil leads in grooved half boards emerging from said grooving machine, a drum-press for fixing together pairs of half boards with pencil leads disposed therein to form sandwich boards, a trimming device for trimming the transverse edges of the sandwich boards, and a coating device and marking device for respectively coating and marking the trimmed transverse edges of the assembled sandwich boards.

6. Apparatus according to claim 5, wherein each of said coating and marking devices comprises a piezoelectric generator for pressurizing protective and printing liquids, respectively, each generator being connected to a pair of projecting heads so disposed as to apply their respectively liquids on opposite transverse edges of the assembled sandwich boards, said apparatus further comprising a programmable control unit for the conjoint control of said piezoelectric generators.

7. Apparatus according to claim 6, further comprising detecting means for supplying said programmable control unit with operational information.

8. Apparatus according to claim 6, further comprising a projecting device under pressure of drops of liquid glue, disposed between said grooving machine and said device for laying the pencil leads, said glue projecting device being adapted to apply a stream of glue in each of the grooves of the grooved half boards.

9. Apparatus according to claim 5, further comprising a projecting device under pressure of liquid glue drops disposed upstream of said drum-press, said glue projecting device being adapted to apply a layer of glue onto the grooved surface of the half boards.

* * * * *